July 24, 1928.

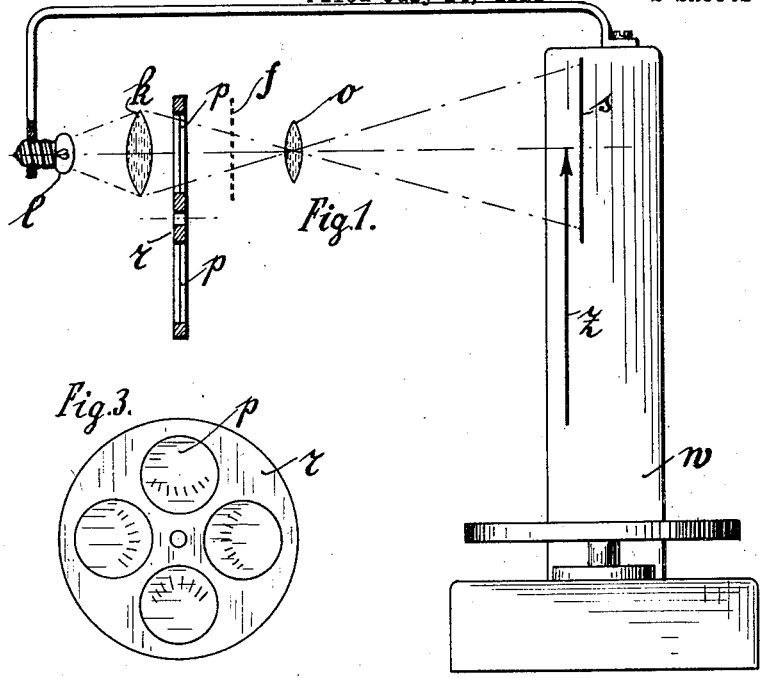
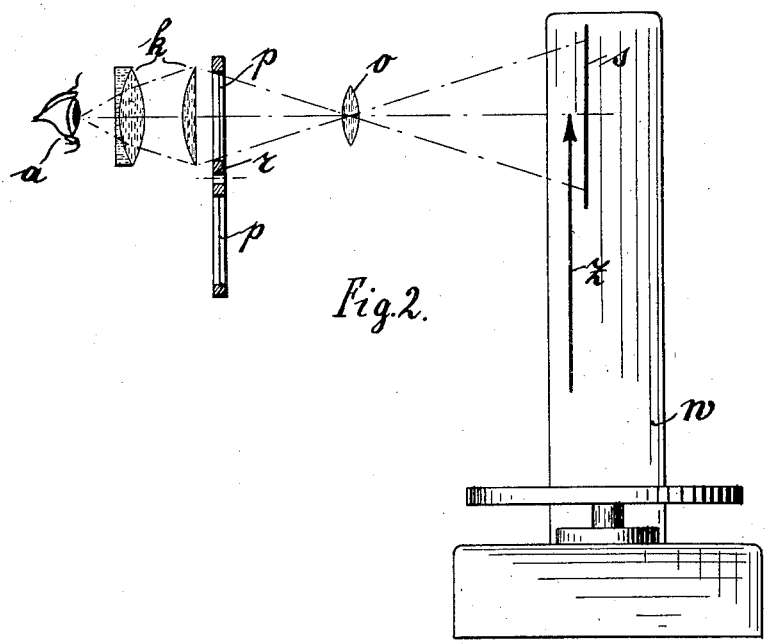

K. MARTIN

PRICE INDICATING BALANCE

Filed July 14, 1926    2 Sheets-Sheet 2

Inventor
Karl Martin

Patented July 24, 1928.

1,678,153

UNITED STATES PATENT OFFICE.

KARL MARTIN, OF RATHENOW, GERMANY.

PRICE-INDICATING BALANCE.

Application filed July 14, 1926, Serial No. 122,491, and in Germany July 1, 1925.

This invention relates to price indicating balances.

The very useful needle balances are recently employed on a large scale, with which the weight of the merchandise can be read off on a dial. Furthermore, balances are well known which indicate at the same time the price of the weighed quantity. This problem has been tried to be realized in the simplest form, by arranging below the scale of the weights a big table which contains the products of the individual weights and units prices. The needle which indicates the weight on the main scale moves at the same time before this price table and enables the price to be read off in each column of amounts.

This reading-off operation, however, is difficult, as the table showing the numeral values must have a very large extent, and errors will thus easily arise. By this reason balances have been constructed, with which the price of the weighed quantity is exhibited immediately, but balances of this type are of course very complicated in structure.

Now my invention has for its object to have a device which makes it possible to ascertain the price of the weighed quantity of merchandise in a very simple manner and offering at the same time the advantage that it can be applied to existing balances having only a scale of weights. This problem is realized according to my invention, by offering to the eye of the seller or customer, besides or instead of the scale of weights the needle plays before, by subjectively or objectively acting optical means, the image of a price scale, said last named scale being able to be altered in a very simple manner. The image of a price scale is projected, either subjectively or objectively, to the indicating side of the balance, and this in such a manner that the needle of the balance or an image of this needle makes indications on this price scale image too.

In order to make my invention more easily understood, two embodiments of the subject-matter of the same are diagrammatically illustrated by way of example in the drawings which accompany and form part of this specification. On these drawings:

Fig. 1 shows the device enabling objective projection,

Fig. 2 the device enabling subjective projection,

Fig. 3 shows a rotary price scale carrier used with these embodiments,

Figure 4:
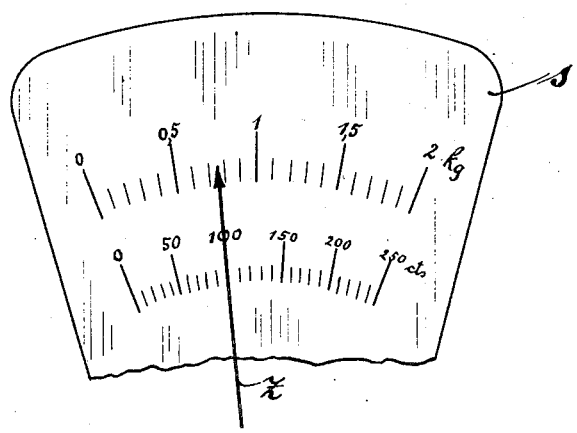
Figs. 4 and 5 are two enlarged views of the scale of weights with a price scale projected thereto.

In both these embodiments $w$ denotes the balance, $z$ the needle, $s$ the scale of weights, $o$ denotes an object-lens and $r$ the rotary price scale carrier comprising a plurality of different price scales $p$ arranged on small glass plates.

As to be seen from Fig. 1, a lamp illuminates the scale $p$ just inserted into the field of view and projects it through the lens $o$ to the scale $s$, a condensing lens being interposed in this optical system. By interposing further a light filter $f$ it is possible to project the price scale for instance in red color, whereas the scale of weights is black, so that both said scales may be clearly distinguished. The image produced on the scale of weights has about the aspect illustrated in Fig. 4. As a matter of course, the zero points of both said scales must be adjusted so as to register correctly. Upon the deflection of the needle $z$, the weight can be read off on the upper scale, and the price on the lower one by means of said needle. In accordance with the different prices a corresponding plurality of price scales $p$ must be arranged on the rotary carrier $r$. This carrier, however, needs not to have exceedingly large dimensions, as, with a suitable selection of the described optical system but very small price scales $p$ are required which are projected to the weight scale $s$ with a suitably high magnification.

In the embodiment illustrated said price scales are shown, for the sake of clearness, in a comparatively large size.

As it will clearly be seen from the drawing, there is no constructive connection between the inner structure of the balance and the described price indicating device, so that this device may easily be constructed as a supplement and combined with each existing needle balance.

In the embodiment illustrated in Fig. 2 the subjective projection is employed. Here the object glass $o$ projects an image of the needle $z$, and under certain circumstances also of the scale $s$, into its plane of image, wherein the interchangeable price scales *p* are to be seen too. The ocular *k* permits the eye *a* to watch the projection and to clearly survey at the same time the needle, the scale of weights and the price scale. In this case too the elements of the device may be united so as to form a complete supplementary device which may be rigidly connected to each existing needle balance.

Instead of the described interchangeable small price scales one single scale may be made use of, which has to be projected with different magnifications. Evidently the spaces existing between the division lines of the scale are inversely proportional to the units prices they symbolize, that means with double units prices said spaces must have half size. Now, as it does not offer any difficulty in optical respects to produce images of different size of an object like said price scale, the described devices need to have but one single price scale instead of a rotary carrier comprising a plurality thereof, and this single scale has to be magnified correspondingly by optical means, account having to be taken of the individual units price of 1 kg.

Figure 5:
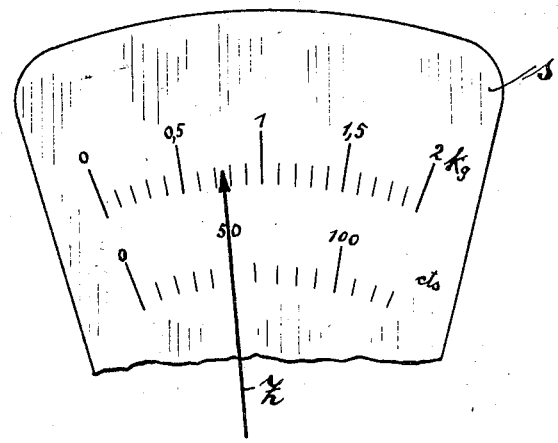

Figs. 4 and 5 illustrate the aspect offered to the operator's eye when the price scales *p* are visible together with the weight scale *s* and needle *z* in different magnification, that of Fig. 5 being double that of Fig. 4, that means the price scale of Fig. 5 refers to a price of 1 kg. of half the amount of that of Fig. 4.

There may of course be two such devices on a balance so that the price of the merchandise may be read off simultaneously by the seller and the customer.

I claim:

1. In a balance having a weight-indicating scale and a needle co-operating therewith, an independent transparent price-indicating scale, a source of light, a system of lenses arranged co-axially thereto, said scale being disposed in the course of the light-rays passing through said lenses, the image of said price indicating scale being projected by said system of lenses into cooperative relation to said needle.

2. In a balance having a weight-indicating scale and a needle adapted to move over said scale, a series of price-indicating scales remote from said weight-indicating scale, and optical means for bringing said needle and weight-indicating scale and any one of said series of price-indicating scales into a common field of vision, with said needle and price-indicating scale in superposed relation and said price and weight-indicating scales in such proximity that the price and weight indicated by said needle can be read practically simultaneously.

In testimony whereof the foregoing specification is signed.

KARL MARTIN.